United States Patent

[11] 3,602,226

[72] Inventor Richard E. Ericson
Barrington, Ill.
[21] Appl. No. 508,672
[22] Filed Nov. 19, 1965
[45] Patented Aug. 31, 1971
[73] Assignee The Kendall Company
Boston, Mass.

[54] SELF-INFLATING CATHETER WITH MEANS TO PREVENT LOSS OF INFLATION FLUID
18 Claims, 5 Drawing Figs.
[52] U.S. Cl. .................................................. 128/349 B
[51] Int. Cl. .................................................. A61m 25/00
[50] Field of Search ....................................... 128/348–351, 246, 325, 344

[56] References Cited
UNITED STATES PATENTS
3,378,011 4/1968 Vitello ......................... 128/349 B
3,379,197 4/1968 Hayes ......................... 128/349 B Primary Examiner—Dalton L. Truluck
Attorneys—James I. Fawcett, Robert D. Chodera, I. W. Underhill and Jerome M. Teplitz ABSTRACT: An inflatable retention catheter's resilient inflated reservoir retaining a fluid under pressure is contained in a fluid impervious jacket to prevent loss of the inflation fluid from the reservoir and to insure adequate inflation of the retaining means by the inflating fluid upon release of said inflating fluid from the reservoir.

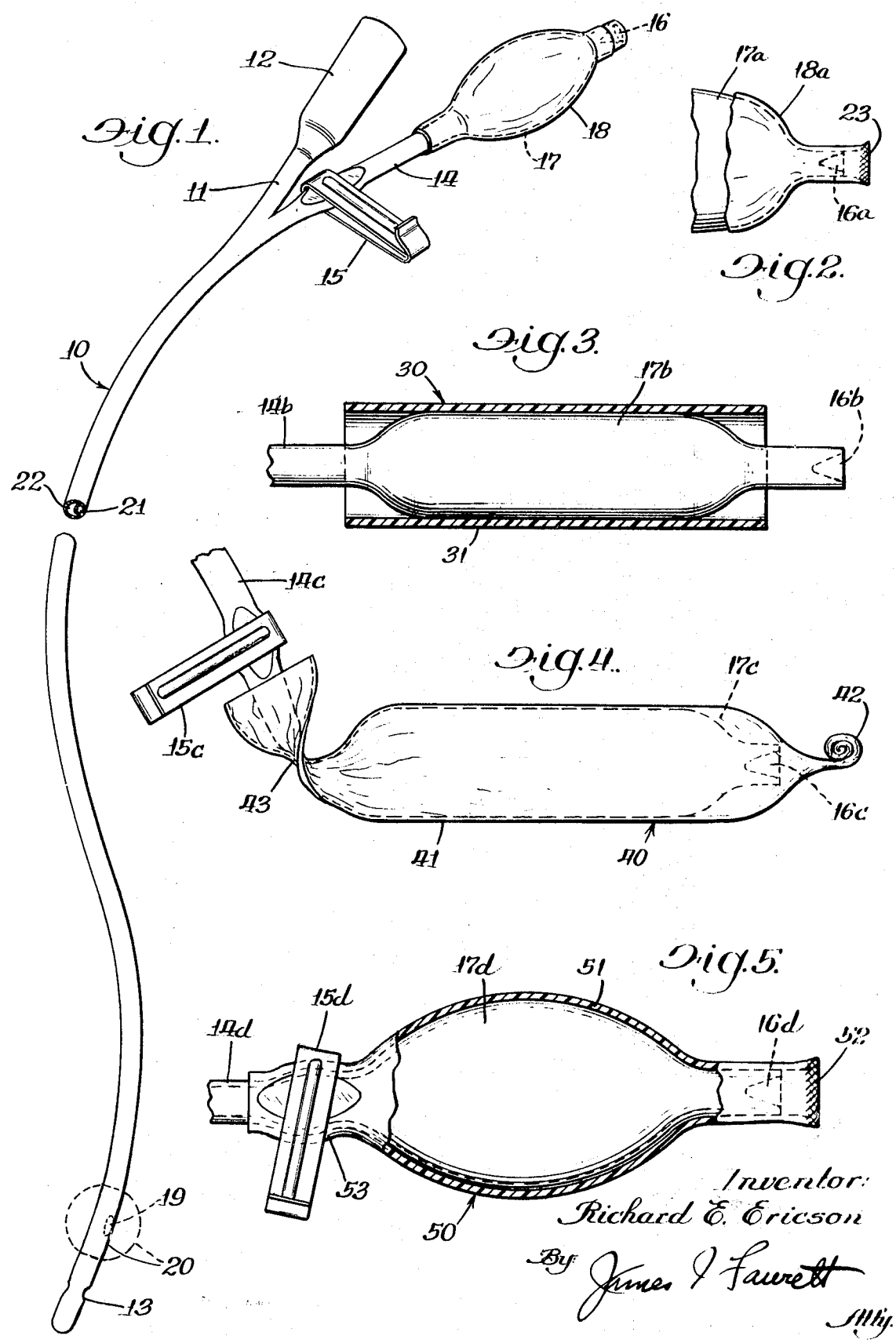

SELF-INFLATING CATHETER WITH MEANS TO PREVENT LOSS OF INFLATION FLUID

This invention is concerned with indwelling catheters of the type including inflatable distal-retaining means connected by a lumen to a proximal resilient inflated reservoir whereby when the fluid retained under pressure and inflating the reservoir is released, the retractive force of the reservoir ejects most of the contained fluid into the lumen and hence into the retaining means with sufficient force to inflate the latter.

For purposes of this invention, the distal portion of the catheter is the end which is placed in the animal body while the proximal portion is the end which remains outside the body.

Particularly, this invention is concerned with means for extending the period of storage during which catheters with resilient inflated reservoirs are functional.

Latex rubber catheter reservoirs when they are distended so that their retaining walls are relatively thin, have a fairly high water vapor, solvent and gas transmission rate and within a relatively short time have lost so much fluid that upon release, the fluid is insufficient to properly inflate the retaining means. The problem is well known but up to the time of this invention the solution was inadequate. Presently, catheters of the water-inflated type are being coated from solvent solutions with resins having relatively low moisture vapor transmission rates. The coatings do minimize the water loss problem but unfortunately where the coating is thick enough to adequately retain the fluid, the rubber, being adherent to the less elastic coating, is unable to retract properly to inflate the inflation means. Coatings applied to the reservoir because of the retraction problem have had, therefore, to be kept quite thin. Shelf life of such catheters is still undesirably short.

It is the object of this invention to provide catheters of the inflatable type with much improved shelf life which improvement is attained without restraining the retractive force of the rubber reservoir.

It is a further object of the invention to provide catheters of the inflatable type in which in some embodiments the reservoir sleeve or jacket is removable after deflation thus reducing bulkiness in use.

These and other objects of the invention will be apparent from a study of the specification and of the drawings in which latter:

FIG. 1 illustrates a typical catheter of the invention with a reservoir jacket containing the inflated reservoir.

FIG. 2 illustrates a modification of the jacket and reservoir of FIG. 1 partially broken away.

FIG. 3 illustrates a further modification of the jacket and reservoir of FIG. 1 showing the jacket in cross section.

FIG. 4 illustrates a further modification of the jacket and reservoir of FIG. 1.

FIG. 5 shown partially in section illustrates a still further modification of the jacket and reservoir of FIG. 1.

I have discovered that substantial extension of the period of storage during which catheters with inflated resilient reservoirs remain functional can be achieved by reducing the surface of the reservoir from which moisture vapor, solvent or gas can escape. I have discovered that the inflated reservoir itself acts as a seal against the jacket and that it is not necessary to have an adherent coating on the reservoir to restrict fluid loss. Thus, materials may be used for reservoir jackets which are not elastic at all or whose elasticity is different from that of the reservoir. Quite rigid materials such as hard plastics, glass and metals may be used as jackets in this invention, whereas before only flexible materials could be used. Contact between the jacket and the reservoir may be achieved in various ways. Where the jacket is rigid or substantially so, one way of achieving contact is to insert the uninflated reservoir into the rigid jacket and inflate it to make contact. Another way of achieving contact is to use a shrinkable material such as film and cause it to shrink into contact with the inflated reservoir. Still another way is to use a stretchable film which may be elastic or inelastic and may be heat softened or solvent softened to render it stretchable. A tubular jacket of this material is placed over the uninflated reservoir whereupon the latter is inflated to stretch the jacket into fairly tight contact with it.

Referring once more to the drawings:

In FIG. 1, a typical catheter of the invention 10 consists of a main tubular arm 11 with a hollow proximal connecting bell 12 for receiving the drainage tubing connector end and a distal end closed except for the drainage eye or eyes 13 which open into the lumen 22 connecting the drainage eyes to the bell 12. The catheter also includes a side arm 14 which joins the main arm 11 and contains the inflation lumen 21 which, except when the catheter is being retained in the patient, is closed by the clamp 15. Obviously, valvular means might be used instead of clamp 15. A combination closure and filling plug 16 terminates the end of the side arm. Intermediate the clamp 15 and the closure 16 is an inflated portion of the side arm, the reservoir 17. Reservoir 17 may be inflated among other ways by inserting a hypodermic syringe needle through the filling plug 16 whereby water or other fluid may be forced into the reservoir under pressure. It is obvious that the plug 16 might be replaced by another type of valve whereby means other than a needle might be used for inflation.

In the embodiment illustrated in FIG. 1, the reservoir is covered with a jacket or sleeve 18 which is shrunk into contact with the reservoir 17. In practice, the jacket 18 may be a tube or it may be partially or almost fully formed before it is shrunk into contact with reservoir by heat or other shrinkage means. In FIG. 1, the lumen 21 extends from the side arm end into the reservoir and from the reservoir into juncture with main arm 11 where it continues as a part of main arm 11 until it reaches the opening 19 within easily inflatable sleeve 20. Lumen 21 connects reservoir 17 and inflatable sleeve 20. When clamp 15 is removed, the fluid under pressure in reservoir 17 is forced along the lumen 21 into sleeve 20 to inflate the latter when the catheter is operative. While a round balloonlike 20 is illustrated, it is obvious that this invention does not depend upon the shape or precise location of the inflatable retention means. Normally, the inflated sleeve 20 is within a chamber to be drained such as an animal bladder where it acts as a stop but it may act by stretching a body lumen to anchor itself.

In FIG. 2, the shrunken jacket 18a covers the reservoir 17a and extends over the side arm end containing the plug 16a. The seal 23 reduces fluid loss at the side arm end.

Where a preshaped jacket is utilized, it may be desirable to form one or both cylindrical ends thereof slightly smaller than the normal side arm outside diameter. The side arm is then stretched longitudinally thus reducing its diameter to the point where the jacket may slip on readily. This can best be done with a tool which passes freely through the jacket to grasp the end of the side arm. Preferably, the filling and stopper plug is inserted afterwards when this technique is used. It has the advantage that when the rubber of the side arm retracts after being stretched longitudinally, it increases in diameter and makes a tight seal with the jacket ends.

In FIG. 3, the reservoir 17b of the modification 30 is distorted by the small transverse dimensions of the jacket 31 so that the area from which water vapor, solvent or gas may escape is limited to the jacket ends which are small in area and have thicker walls. The catheter side arm 14b which is connected to a main arm of a catheter as in FIG. 1 is similarly closed with a clamp. The side arm end is closed with filling and closure plug 16b. This plug as well as those illustrated in the other Figures may be used to draw fluid from the inflated retention means using an empty needle syringe, thus permitting the catheter to be withdrawn. The side arm may also be severed, thus deflating the retention means in an emergency or where the catheter is not to be reused.

In FIG. 4, modification 40 has a more flexible jacket than that illustrated in FIG. 3 but one which distorts the reservoir 17c by reason of its small transverse dimensions. As can be seen in this embodiment, the jacket extends over the end of the side arm 14c covering the filling and closure plug 16c and having a fold seal 42 at its end. At the opposite end, the jacket is given a twist 43 to make it conform closely to the side arm 14c. The clamp 15c operates to close the side arm. It is to be understood that the side arm 14c is connected to a main arm and is part of an inflatable retention catheter such as is shown in FIG. 1. The material of the jacket FIG. 4 preferably is of metal foil but it might be of cohesive film in one or more layers.

In FIG. 5, the embodiment 50 is understood to be a part of a catheter of the general type shown in FIG. 1. This embodiment resembles superficially that shown in FIG. 2 except that the jacket 51 is not shrunk into contact with the reservoir. Rather, the jacket is preformed or formed by stretching. Where the jacket 51 is preformed, of course, it is placed over the reservoir 17d prior to the latter's inflation and the clamp 15d is applied to flatten the jacket as at 53 and close the lumen of the side arm 14d. At that time, the jacket end 52 is not sealed as shown. The reservoir 17d is inflated through the filling and stop plug 16d. Any entrapped air may be voided by compressing the reservoir with an instrument as the filling proceeds. Thereafter, the jacket 52 is heat sealed or otherwise sealed closed.

When the jacket is only partially formed or is substantially tubular it may be applied before the reservoir is filled in a softened or otherwise stretchy condition and take form with the reservoir as the latter is inflated. Again, the end 52 is sealed after the reservoir is inflated.

Some of the embodiments of the invention are obviously more efficient than others in prolonging the functional life of inflatable catheters. In general, where the jacket is of material through whose walls substantially no fluid escapes, the functional life of the catheter is dependent upon the end seals. That is, a jacket such as that shown in FIG. 3 would be less efficient in extending the functional life of the catheter than those shown in FIGS. 2 and 5. One of the best catheters with regard to functional life is one in which the cylindrical end portions of the jacket are slightly smaller than the side arm so that there is always a resilient seal even when the reservoir is empty between these jacket ends and the rubber of the side arm. A variation in which the jacket end is sealed as shown in FIGS. 2 and 5 is also very efficient but is more difficult to assemble except where the tip of the side arm is made smaller than the remainder of the side arm.

I claim:

1. In combination, a self-inflatable retention bag catheter comprising an elongated flexible thin-walled drainage tube open at its proximal end and having at least one lateral opening in its distal end, a thin-walled elastic sleeve adjacent the distal end of said drainage tube, said sleeve being bonded along its marginal zones to the exterior surface of said drainage tube to form a fluidtight seal along said marginal zones of said sleeve and being unattached to said drainage tube along its central region whereby the central region of said sleeve is free to expand laterally of said drainage tube upon the introduction of an inflating fluid into the space formed between the unattached central region of the sleeve and the exterior surface of the drainage tube adjacent thereto, a flexible inflation tube opening at its distal end into the space formed between the unattached central region of said sleeve, and the exterior surface of the drainage tube adjacent the central region of the said sleeve, the proximal end of said inflation tube terminating in an elastic inflation arm offset from the proximal end of said drainage tube, said inflation arm being expanded into a resilient inflated reservoir throughout a portion of its length by a fluid enclosed therein under pressure, and a sleeve containing said reservoir, the interior surface of said sleeve making separable contact with a substantial external part of the inflated portion of said reservoir.

2. The inflatable retention catheter of claim 1 wherein the inflated reservoir has its resilient inflated portion distorted by contact with said sleeve.

3. The inflatable retention catheter of claim 1 wherein the sleeve is internally cylindrical at least in that portion contacting the inflated portion of said reservoir.

4. The inflatable retention catheter of claim 1 wherein the reservoir is situated adjacent the end of said inflation tube containing the inflation arm of said catheter and wherein said sleeve has a closed end and contains the end portion of said side arm including said reservoir.

5. The inflatable retention catheter of claim 1 wherein the sleeve is a shrink-fit with said inflated reservoir.

6. The inflatable retention catheter of claim 4 wherein an open end of the sleeve form a tight circumferential fit with the side arm of said catheter.

7. The inflatable retention catheter of claim 1 wherein the sleeve is formed of metal foil.

8. The inflatable retention catheter of claim 1 wherein the sleeve consists of an internally ovoid central portion except for substantially internally cylindrical end portions.

9. The inflatable retention catheter of claim 4 wherein the open end of the sleeve is clamped shut by a clamp which simultaneously clamps shut the lumen of said side arm.

10. The inflatable retention catheter of claim 1 wherein the sleeve consists of an internally ovoid central portion except for an internally cylindrical open end and a closed end at least internally cylindrical where it meets the ovoid portion.

11. In combination, a self-inflatable bag catheter comprising an elongated flexible thin-walled drainage tube open at its proximal end and having at least one lateral opening in its distal end, a thin-walled elastic sleeve adjacent the distal end of said drainage tube, said sleeve being bonded along its marginal zones to the exterior surface of said drainage tube to form a fluidtight seal along said marginal zones of said sleeve and being unattached to said drainage tube along its central region whereby the central region of said sleeve is free to expand laterally of said drainage tube upon the introduction of an inflating fluid into the space formed between the unattached central region of the sleeve and the exterior surface of the drainage tube adjacent thereto, a flexible inflation tube opening at its distal end into the space formed between the unattached central region of the said sleeve and the exterior surface of the drainage tube adjacent the central region of the said sleeve, the proximal end of said inflation tube terminating in an elastic inflation arm offset from the proximal end of said drainage tube, means in the mouth of said inflation arm for maintaining the proximal end of the inflation arm normally closed, a fluid-impervious flexible envelope positioned over the said inflation arm, said envelope being closed at the sides and along its proximal end, means disposed over the distal end of said envelope and over said inflation arm at a location spaced from the proximal end of the inflation arm for collapsing and closing the passage of the inflation arm to form a sealed chamber in the inflation arm and for closing the distal end of said envelope, said sealed chamber in said inflation arm containing an inflating fluid under pressure in sufficient quantity to cause inflation of the said sleeve adjacent the distal end of said drainage tube upon removal of the said means for collapsing and closing the passage of the inflation arm.

12. The combination of claim 11 in which said envelope disposed over the said inflation arm is transparent.

13. The combination of claim 12 in which said envelope disposed over the said inflation arm is formed of a heat-sealable material and is sealed along its proximal end by a heat-seal.

14. The combination of claim 13 in which said envelope disposed over the said inflation arm is a tubular member sealed along its proximal end by a heat-seal.

15. In an inflatable bag catheter device of the type having an elongate main shaft portion provided with a tip at its distal end and a drainage tube portion at its proximal end and a drainage passage communicating said tip and said drainage tube portion, an elastic reservoir tube branching from said main shaft portion, an inflatable sleeve surrounding said main shaft portion adjacent its distal end, and a distention fluid lumen communicating said reservoir tube with said sleeve, the improvement comprising:

means for closing the proximal end of said reservoir tube, releasable clamp means closing said reservoir tube at a point spaced from said means for closing the proximal end of the reservoir tube to form a fluid chamber therebetween, a sealing bag enclosing a portion of said reservoir tube between said releasable clamp means and said means for closing said reservoir tube, and enclosing a volume substantially greater than the enclosed portion of the reservoir tube when relaxed, said bag being constructed of fluid impervious and flexible but substantially inelastic material, and a quantity of fluid in said chamber of an amount to expand the enclosed portion of said reservoir tube into contact throughout with the inner surface of said sealing bag.

16. In an inflatable bag catheter of the type having an elongate main shaft portion provided with a tip at its distal end and a drainage tube portion at its proximal end and a drainage passage communicating said tip and said drainage tube portion, an elastic reservoir tube branching from said main shaft portion, an inflatable sleeve surrounding said main shaft portion adjacent its distal end, and a distention fluid lumen communicating said reservoir tube with said sleeve, the improvement comprising:

means blocking said reservoir tube at spaced points thereon to define an inflating fluid chamber therebetween, a quantity of fluid within said chamber of such amount as to inflate said tube, and a sealing bag enclosing the inflated portion of said tube and contacting the inflated portion of said tube throughout the outer surface thereof to form a sealing barrier at and throughout the outer surface of said inflated portion of said tube, said sealing bag being constructed of fluid impervious material.

17. In an inflatable bag catheter of the type having an elongate main shaft portion provided with a tip at its distal end and a drainage tube portion at its proximal end and a drainage passage communicating said tip and said drainage tube portion, an elastic reservoir tube branching from said main shaft portion, an inflatable sleeve surrounding said main shaft portion adjacent its distal end, and a distention fluid lumen communicating said reservoir tube with said sleeve, the improvement comprising:

means blocking said reservoir tube at spaced points thereon to define an inflating fluid chamber therebetween, a quantity of fluid within said chamber of such amount to inflate said tube, and a substantially inelastic bag enclosing the inflated portion of said tube and contacting the inflated portion of said tube throughout the outer surface thereof to form a sealing barrier at and throughout the outer surface of said inflated portion of the tube, said sealing bag being constructed of fluid-impervious material.

18. In an inflatable bag catheter device of the type having an elongate main shaft portion provided with a tip at its distal end and a drainage tube portion at its proximal end and a drainage passage communicating said tip and said drainage tube portion, an elastic reservoir tube branching from said main shaft portion, an inflatable sleeve surrounding said main shaft portion adjacent its distal end, and a distention fluid lumen communicating said reservoir tube with said sleeve, the improvement comprising:

a substantially inelastic sac enclosing a portion of said reservoir tube, said sac having a necked down portion at its opposite ends engaging spaced points along the reservoir tube and being bulbous therebetween, said sac being constructed of fluid impervious material, means for blocking said reservoir tube adjacent said necked down portions of the sac to define an inflating fluid chamber therebetween, and a quantity of fluid in said chamber in an amount to expand the enclosed portion of said reservoir tube into sealing contact throughout with the bulbous inner surfaces of said sac.